US012718821B2

(12) United States Patent
Lee et al.

(10) Patent No.: US 12,718,821 B2
(45) Date of Patent: Aug. 25, 2026

(54) METHOD AND APPARATUS FOR SPEAKER VERIFICATION BASED ON NEXT-TDNN

(71) Applicants: Hyundai Motor Company, Seoul (KR); Kia Corporation, Seoul (KR); Sogang University Research & Business Development Foundation, Seoul (KR)

(72) Inventors: Ran Lee, Seoul (KR); Hyung-Min Park, Seoul (KR); Hyun-Jun Heo, Seoul (KR); Ui-Hyeop Shin, Seoul (KR)

(73) Assignees: Hyundai Motor Company, Seoul (KR); Kia Corporation, Seoul (KR); Sogang University Research & Business Development Foundation, Seoul (KR)

( * ) Notice: Subject to any disclaimer, the term of this patent is extended or adjusted under 35 U.S.C. 154(b) by 167 days.

(21) Appl. No.: 18/883,002

(22) Filed: Sep. 12, 2024

(65) Prior Publication Data

US 2025/0316273 A1 Oct. 9, 2025

(30) Foreign Application Priority Data

Apr. 4, 2024 (KR) ........................ 10-2024-0045771

(51) Int. Cl.
*G10L 17/04* (2013.01)
*G10L 17/18* (2013.01)

(52) U.S. Cl.
CPC .................................. *G10L 17/18* (2013.01)

(58) Field of Classification Search
CPC ......... G10L 17/04; G10L 17/18; G10L 17/26; G10L 15/16
See application file for complete search history.

(56) References Cited

U.S. PATENT DOCUMENTS

2015/0058015 A1* 2/2015 Mitsufuji .............. G10L 21/003 704/243
2015/0294670 A1* 10/2015 Roblek ................... G10L 17/18 704/232
2024/0119927 A1* 4/2024 Koluguri ................. G10L 17/02
2024/0304175 A1* 9/2024 Erdmann .............. G10L 13/047
2025/0029632 A1* 1/2025 Park ........................ G10L 17/04

OTHER PUBLICATIONS

Dec. 15, 2023, "Next-TDNN: Modernizing Multi-Scale Temporal Convolution Backbone for Speaker Verification".
Aug. 1, 2020 "ECAPA-TDNN: Emphasized Channel Attention, Propagation and Aggregation in TDNN Based Speaker Verification".
Jan. 2, 2023 "ConvNext V2: Co-designing and Scaling ConvNets with Masked Autoencoders".

* cited by examiner

*Primary Examiner* — Daniel Abebe
(74) *Attorney, Agent, or Firm* — Banner & Witcoff, Ltd.

(57) ABSTRACT

A method and an apparatus are disclosed for a speaker verification. The apparatus may comprise at least one processor configured to execute instructions to perform generating, based on an utterance of a speaker to a deep learning-based speaker verification model, a speaker embedding with a preset dimension, verifying, based on the speaker embedding, the speaker, and detecting, based on the verified speaker, an identity of a user associated with the apparatus.

20 Claims, 9 Drawing Sheets

METHOD AND APPARATUS FOR SPEAKER VERIFICATION BASED ON NEXT-TDNN

CROSS-REFERENCE TO RELATED APPLICATIONS

This application claims priority to and the benefit of Korean Patent Application No. 10-2024-0045771, filed on Apr. 4, 2024, the entire contents of which are incorporated herein by reference.

TECHNICAL FIELD

The present disclosure relates to a new time delay neural network based speaker verification method and apparatus.

BACKGROUND

The statements in this section merely provide background information related to the present disclosure and do not constitute prior art.

Speaker verification may extract speaker embeddings (e.g., vectors of fixed dimensions) from speaker utterances and compares the similarity between the extracted speaker embeddings and the registered speaker embeddings, thereby determining whether a given utterance is from a registered speaker. For speaker verification, speaker verification models may convert the speaker utterances into a vector of a fixed dimension. Regardless of the length of an utterance, the speaker embeddings may have the same dimensions. For example, if the dimension of the speaker embedding is 192, even if an utterance is 2 or 3 seconds long, the speaker verification model may convert the given utterance into a 192-dimensional vector.

Deep learning-based speaker verification models may be constructed based on a neural network (e.g., a time delay neural network (TDNN)). A TDNN-based model may correspond to one dimensional (1D) convolutional neural network (CNN) with a stride of 1, and output embeddings by processing input vectors with different time indices. The TDNN-based model for speaker verification may include a backbone block that processes input features and a block that pools the processed features in a time axis direction.

As an example, emphasized channel attention, propagation and aggregation-TDNN (ECAPA-TDNN) may be applied for the speaker verification. The ECAPA-TDNN is a backbone block and includes a plurality of layers (e.g., Res2Net layers) that generate the feature maps of multiple scales from the speaker utterance. The ECAPA-TDNN may comprise a multi-layer feature aggregation (MFA) block that integrates feature maps of Res2Net layers. The ECAPA-TDNN may further comprise an attentive statistics pooling (ASP) block as a pooling block. The ASP block may assign weights to the output of the MFA based on attention. The ECAPA-TDNN may generate the aforementioned speaker embedding by applying a fully-connected layer (FC), a linear layer, to the output of ASP. Regarding ResNet, which may add residual connections to a convolution module, Res2Net may comprise a structure for effectively extracting features for the multiple scales.

Despite excellent speaker verification performance by the use of Res2Net layers and ASP blocks, the ECAPA-TDNN may have the following issues. The Res2Net layer, a backbone block in the ECAPA-TDNN, may be a block with a single configuration that extracts voice features. Accordingly, in order to generate a high-dimensional feature map that reflects the input intra-frame/inter-frame contexts, the number of Res2Net layers may be increased. If the number of Res2Net layers increases, the parameters of the speaker verification model increase in the process of applying the MFA block to integrate the feature maps of the Res2Net layers, and the amount of calculations may increase significantly. In addition or alternative, the ECAPA-TDNN may have an issue of slow calculation speed due to the structure that may not be suitable for parallel calculations. Accordingly, there is a need to consider a backbone block that may improve the performance of speaker verification while reducing the complexity and calculation amount of the speaker verification model and increasing calculation speed.

SUMMARY

According to the present disclosure, an apparatus may comprise at least one processor and a memory that stores instructions and communicates with the at least one processor, wherein the at least one processor is configured to execute the instructions to perform generating, based on an utterance of a speaker to a deep learning-based speaker verification model, a speaker embedding with a preset dimension by generating first output frames by providing a plurality of input frames to one dimensional convolution layer, wherein the first output frames comprise features of a predefined dimension, providing the first output frames to two-step layers, wherein each of the two-step layers is configured to generate second output frames may comprise multi-scale features, wherein the two-step layers are connected in series, wherein each of the two-step layers comprises at least one two-step block, and wherein the at least one two-step block is connected in series, generating third output frames may comprise aggregated features by concatenating an output of each of the two-step layers and by providing the concatenated output to a multi-layer feature aggregation block, generating an attention vector by providing the third output frames to an attentive statistics pooling (ASP) block, weighted-summing, based on the attention vector, the third output frames, and generating the speaker embedding by providing an output of the ASP block to a linear layer, wherein the output of the ASP block is generated based on the weighted-summing, verifying, based on the speaker embedding, the speaker, and detecting, based on the verified speaker, an identity of a user associated with the apparatus.

The apparatus, wherein the at least one processor is further configured to execute the instructions to perform setting, based on the verified speaker, a driver profile associated with autonomous driving control of the vehicle The apparatus, wherein each of the two-step layers reflects intra-frame and inter-frame contexts to generate the multi-scale features.

The apparatus, wherein an input and an output of each of the two-step layers comprise an equal number of frames, wherein the frames comprise features of an equal dimension.

The apparatus, wherein an input and an output of each of the at least one two-step block comprises an equal number of frames, wherein the frames comprise features of an equal dimension.

The apparatus, wherein each of the at least one two-step block comprises a multi-scale convolution (MSC) block that generates intermediate frames in which inter-frame contexts are reflected by applying temporal multi-scale one dimensional convolution to input frames of each of the at least one two-step block, and a feed-forward network (FFN) that generates output frames of each of the at least one two-step block in which intra-frame contexts are reflected from the intermediate frames.

The apparatus, wherein each of the MSC block and the FFN comprises a residual connection.

The apparatus, wherein the MSC block comprises a pointwise parallel block that comprises pointwise convolution blocks disposed in parallel by a preset scaling factor and generates reduced-dimensional features by applying one dimensional pointwise convolution to the input frames of each of the at least one two-step block, and a depth-wise parallel block that comprises depth-wise convolution blocks disposed in parallel by the preset scaling factor and applies, based on kernels of different sizes, one dimensional depth-wise convolution to an output of the pointwise parallel block.

The apparatus, wherein the MSC block further comprises a gaussian error linear unit (GELU), which is an activation function that processes concatenation of outputs of the depth-wise parallel block, and a first pointwise convolution block of the pointwise convolution blocks, wherein the first pointwise convolution block generates the intermediate frames by applying the one dimensional pointwise convolution to an output of the GELU.

The apparatus, wherein the FFN comprises a second pointwise convolution block of pointwise convolution blocks, wherein the second pointwise convolution block applies one dimensional pointwise convolution to the intermediate frames to expand a number of features of each of the intermediate frames, global response normalization (GRN), which improves contrast between the intermediate frames by globally normalizing an output of the second pointwise convolution block, and a third pointwise convolution block of the pointwise convolution blocks, wherein the third pointwise convolution block reduces a number of features of an output of the GRN.

The apparatus, wherein the GRN generates an reduced-dimensional vector by applying a response normalization function to feature vectors for each frame corresponding to the output of the second pointwise convolution block, and calibrates, based on skip connection and the reduced-dimensional vector each of the feature vectors for each frame.

The apparatus, wherein the ASP block generates an average vector and a standard deviation vector by weighted-summing, based on the attention vector, the third output frames.

According to the present disclosure, a method performed by a processor, the method may comprise generating, based on an utterance of a speaker to a deep learning-based speaker verification model, a speaker embedding with a preset dimension by generating first output frames by providing a plurality of input frames to one dimensional convolution layer, wherein the first output frames comprises features of a predefined dimension, providing the first output frames to two-step layers, wherein each of the two-step layers generates second output frames may comprise multi-scale features, wherein the two-step layers are connected in series, wherein each of the two-step layers comprises at least one two-step block, and wherein the at least one two-step block is connected in series, generating third output frames may comprise aggregated features by concatenating an output of each of the two-step layers and by providing the concatenated output to a multi-layer feature aggregation block, generating an attention vector by providing the third output frames to an attentive statistics pooling (ASP) block, weighted-summing, based on the attention vector, the third output frames, and generating the speaker embedding by providing an output of the ASP block to a linear layer, wherein the output of the ASP block is generated based on the weighted-summing, verifying, based on the speaker embedding, the speaker, and detecting, based on the verified speaker, an identity of a user associated with the apparatus.

The method, wherein generation of the second output frames comprises generating intermediate frames in which inter-frame contexts are reflected by providing input frames of each of the at least one two-step block to a multi-scale convolution block to perform temporal multi-scale one dimensional convolution, and generating output frames of each of the at least one two-step block in which intra-frame contexts are reflected by providing the intermediate frames to a feed-forward network.

The method, wherein generating the intermediate frames comprises generating reduced-dimensional features by providing the input frames of each of the at least one two-step block to a pointwise parallel block to perform one dimensional pointwise convolution, and providing an output of the pointwise parallel block to a depth-wise parallel block to perform, based on kernels of different sizes, one dimensional depth-wise convolution.

The method, wherein generating the intermediate frames further comprises processing, based on a gaussian error linear unit (GELU), concatenation of outputs of the depth-wise parallel block, wherein the GELU is an activation function, and generating the intermediate frames by providing an output of the GELU to a first pointwise convolution block to perform one dimensional pointwise convolution.

The method, wherein generating the output frames of each of the at least one two-step block comprises expanding a number of features of each of the intermediate frames by providing the intermediate frames to a second pointwise convolution block and applying one dimensional pointwise convolution, improving contrast between the intermediate frames by providing an output of the second pointwise convolution block to global response normalization (GRN) to globally normalize the output of the second pointwise convolution block, and providing an output of the GRN to a third pointwise convolution block to reduce a number of features of the output of the GRN.

The method, wherein the improving the contrast between the intermediate frames comprises generating an reduced-dimensional vector by applying a response normalization function to feature vectors for each frame corresponding to the output of the second pointwise convolution block, and calibrating, based on skip connection and the reduced-dimensional vector, each of the feature vectors for each frame.

According to the present disclosure, a non-transitory computer-readable recording medium storing instructions, when executed, cause generating, based on an utterance of a speaker to a deep learning-based speaker verification model, a speaker embedding with a preset dimension by generating first output frames by providing a plurality of input frames to one dimensional convolution layer, wherein the first output frames comprise features of a predefined dimension, providing the first output frames to two-step layers, wherein each of the two-step layers configured to generate second output frames may comprise multi-scale features, wherein the two-step layers are connected in series, wherein each of the two-step layers comprises at least one two-step block, and wherein the at least one two-step block is connected in series, generating third output frames may comprise aggregated features by concatenating an output of each of the two-step layers and by providing the concatenated output to a multi-layer feature aggregation block, generating an attention vector by providing the third output frames to an attentive statistics pooling (ASP) block, weighted-summing, based on the attention vector, the third output frames, and generating the speaker embedding by providing an output of the ASP block to a linear layer, wherein the output of the ASP block is generated based on the weighted-summing, verifying, based on the speaker embedding, the speaker, and detecting, based on the verified speaker, an identity of a user associated with the apparatus.

The non-transitory computer-readable recording medium, wherein each of the two-step layers reflects intra-frame and inter-frame contexts to generate the multi-scale features.

The non-transitory computer-readable recording medium, wherein an input and an output of each of the two-step layers comprise an equal number of frames, wherein the frames comprise features of an equal dimension.

DETAILED DESCRIPTION

Figure 1:
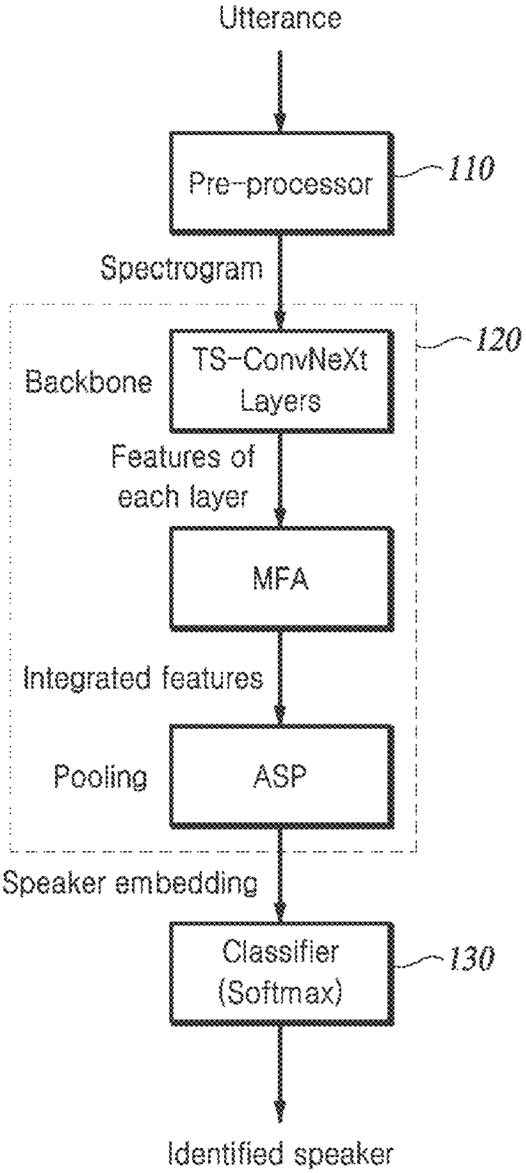
FIG. 1 shows an example of a speaker verification apparatus according to an example of the present disclosure.

Hereinafter, some examples of the present disclosure are described in detail with reference to the accompanying illustrative drawings. In the following description, like reference numerals designate like elements, although the elements are shown in different drawings. Further, in the following description of some examples, detailed descriptions of related known components and functions when considered to obscure the subject of the present disclosure may be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The detailed description set forth below in conjunction with the accompanying drawings is intended to illustrate examples of the features and is not intended to represent the only examples in which the features may be practiced.

The present disclosure in some examples relates to speaker verification that extracts a speaker embedding from speaker utterances. More specifically, the present disclosure provides a speaker verification method and apparatus that generates the speaker embedding using NeXt-time delay neural network (TDNN), a deep learning-based speaker verification model including TS-ConvNeXt (Two-step ConvNeXt) layers.

FIG. 1 shows an example of a speaker verification apparatus according to an example of the present disclosure.

The speaker verification apparatus according to an example of the present disclosure generates frames to be applied to a speaker verification model by preprocessing utterances of a speaker, provides the generated frames to the deep learning-based speaker verification model to generate speaker embedding, and classifies the speaker embedding and ultimately identifies the speaker. The speaker verification apparatus includes all or part of a pre-processor 110, a speaker verification model 120, and a classifier 130. Herein, the components included in the speaker verification apparatus according to an example of the present disclosure are not necessarily limited thereto. The speaker verification apparatus may additionally include a training unit (not shown) for training the speaker verification model 120, or may be implemented in a form that is linked to an external training unit.

Each component of the apparatus or method according to the present disclosure may be implemented as hardware or software or implemented as a combination of hardware and software. Further, a function of each component may be implemented as software, and a microprocessor may also be implemented to execute the function of the software corresponding to each component.

The preprocessor 110 converts an utterance frame on a time domain into a frame on a frequency domain, for example, by converting the same into a Mel-spectrogram. The utterance frame on the time domain includes a preset number of utterance samples, and neighboring utterance frames may overlap each other. The preprocessor 110 transfers frames corresponding to a plurality of time indices, i.e., frames on the frequency domain, to the speaker verification model 120.

As another example, the utterance frames on the time domain may be directly transferred to the speaker verification model 120. In this connection, operations performed by the preprocessor 110 may be omitted.

The classifier 130 generates cross entropy between a vector of a preset dimension (for example, 192 dimensions) representing the speaker embedding and the vectors of the registered speakers, and then applies, for example, a softmax function to the cross entropy to identify a speaker. In this connection, as an example of the softmax function, an additive angular margin loss (AAM)-softmax function that uses the angle between vectors may be used.

The speaker verification model 120 generates a speaker embedding from input frames. As described above, the speaker embedding is a vector of preset dimensions.

The speaker verification model 120 is a TDNN-based model (e.g., x-vector using TDNN layers to extract speaker embeddings from audio data for speaker recognition tasks) and includes a backbone block that processes input features and a block that pools the processed features in a time axis direction. The NeXT-TDNN, the speaker verification model 120 according to an example of the present disclosure, includes a number of TS-ConvNeXt layers as a backbone block. In this connection, one TS-ConvNeXt layer includes at least one TS-ConvNeXt block. To concatenate features for each layer, the speaker verification model 120 includes a multi-layer feature aggregation (MFA) block. In addition or alternative, the speaker verification model 120 includes an attentive statistics pooling (ASP) block as a pooling block. The MFA block and ASP block perform the same or similar operations as the MFA block and ASP block used in the aforementioned ECAPA-TDNN.

Hereinafter, features, feature maps, and channels are used interchangeably.

Figure 2:
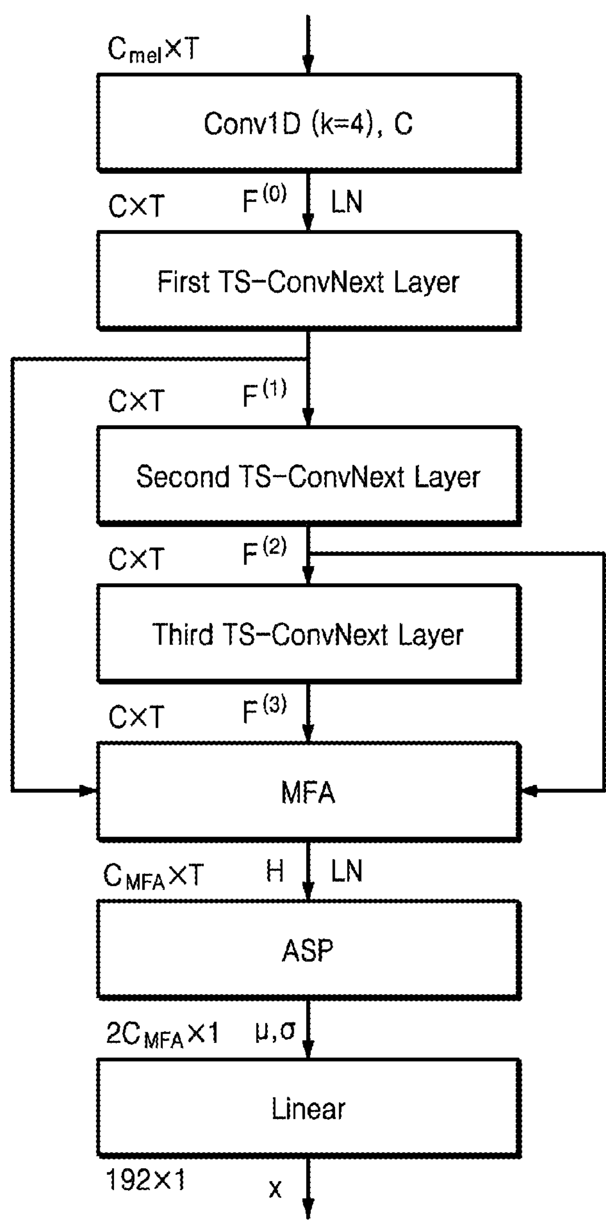
FIG. 2 shows an example of a structure of a speaker verification model according to an example of the present disclosure.

FIG. 2 shows an example of a structure of a speaker verification model according to an example of the present disclosure.

As illustrated in FIG. 2, the NeXT-TDNN, the speaker verification model 120, includes all or part of a one-dimensional convolutional layer used in neural networks for processing sequential data (e.g., a Conv1D layer), a plurality of layers in time series version of ConvNeXt architecture (e.g., TS-ConvNeXt layers), an MFA block, an ASP block, and a linear layer. TS-ConvNeXt is a convolutional neural network (CNN) architecture for time series data. The "TS" prefix indicates the adaptation of ConvNeXt layers for time series data.

The Conv1D layer is a 1D convolution layer that extracts features from frames in the frequency domain and transfers the same to the first TS-ConvNeXt layer. In the example of FIG. 2, k represents the size of the kernel used for 1D convolution. $C_{mel}$ represents the number of Mel-features in a frame on the frequency domain, and T represents the number of frames. C represents the number of feature maps for each frame generated by the Conv1D layer, i.e., the number of channels. In other words, the output of the Conv1D layer has C×T dimensions. Layer normalization (LN) is applied to the output of the Conv1D layer. The LN normalizes samples using the mean and variance of the output samples of the layer.

The TS-ConvNeXt layers (in the example of FIG. 2, the first TS-ConvNeXt layer, the second TS-ConvNeXt layer, and the third TS-ConvNeXt layer) are connected in series. Each of the TS-ConvNeXt layers processes the input features based on 1D convolution and outputs multi-scale features reflecting intra-frame and inter-frame contexts. In the example of FIG. 2, three TS-ConvNeXt layers form the backbone. The input and output of each of the TS-ConvNeXt layers ($F^{(0)}$, $F^{(1)}$, $F^{(2)}$, and $F^{(3)}$ in the example in FIG. 2) have the same dimension. The input and output of each of the TS-ConvNeXt layers may include T frames containing C feature maps and have C×T dimensions. The output of each of the TS-ConvNeXt layers ($F^{(1)}$, $F^{(2)}$, and $F^{(3)}$) is transferred to the MFA block. In addition or alternative, each of the TS-ConvNeXt layers includes at least one TS-ConvNeXt block connected in series. The input and output of each of the TS-ConvNeXt blocks have the same dimension. The input and output of each of the TS-ConvNeXt blocks may have C×T dimensions.

The MFA block concatenates the output features of each of the TS-ConvNeXt layers and then processes the concatenated features using a PConv1D (1D pointwise convolution) block to output an integrated feature map for each frame. In the example of FIG. 2, the number of integrated feature maps is denoted by $C_{MFA}$. For example, if three TS-ConvNeXt layers are used and the dimension of the output feature map of each of the TS-ConvNeXt layers is C, the $C_{MFA}$ may be 3C. The LN is applied to the output of the MFA block.

In the example of FIG. 2, H represents the frames of the integrated feature map and has dimensions of $C_{MFA}$×T. Hereinafter, a vector representing the output of the MFA block for each frame is denoted as $h_t (1 \le t \le T)$. Accordingly, the dimension of $h_t$ is $C_{MFA}$.

The ASP block uses attention to generate utterance-level embedding from a frame-by-frame output of the MFA block. The ASP block generates an attention vector at for each frame with a dimension of $C_{MFA}$, and each component of the attention vector is a value that exists between 0 and 1. The ASP block generates a weighted average vector and a standard deviation vector a by applying the attention vector to the frame-by-frame output of the MFA block, as shown in Equation 1 and Equation 2.

$$\mu = \sum_{t=1}^{T} \alpha_t \odot h_t \quad \text{[Equation 1]}$$

$$\sigma = \sqrt{\sum_{t=1}^{T} \alpha_t \odot h_t \odot h_t - \mu \odot \mu} \quad \text{[Equation 2]}$$

In Equation 1 and Equation 2, $\odot$ represents a Hadamard product, i.e., the elementwise product of two matrices/vectors. The weighted average vector and standard deviation vector each have the dimension of $C_{MFA}$. Accordingly, the output of the ASP block has a dimension of $2C_{MFA}$.

The linear layer is a fully-connected layer (FC), which generates the speaker embedding described above from statistical features representing the output of the ASP. In the example of FIG. 2, the vector x representing the speaker embedding has a preset dimension (for example, 192 dimensions).

Learning of the process of verifying a speaker may be performed by a training unit using learning utterances. In this connection, a speaker identifier corresponding to the utterance may be used as ground truth (GT). For example, the training unit generates output by providing learning utterances to the speaker verification apparatus, and then calculates a loss function based on the difference between the output of the speaker verification apparatus and the GT. The training unit may update the parameters of the speaker verification model 120 and the classifier 130 in the direction of reducing the loss function.

Compared to the existing ECAPA-TDNN, the difference in terms of structure of the NeXT-TDNN is the backbone block. Hereinafter, before describing the structure of the TS-ConvNeXt block in the speaker verification model 120 in detail, the squeeze-excitation (SE)-Res2Net layer used as a backbone block in the ECAPA-TDNN is described. Except for the backbone block containing three SE-Res2Net layers, the ECAPA-TDNN has the same/similar structure to the NeXT-TDNN.

Figure 3:
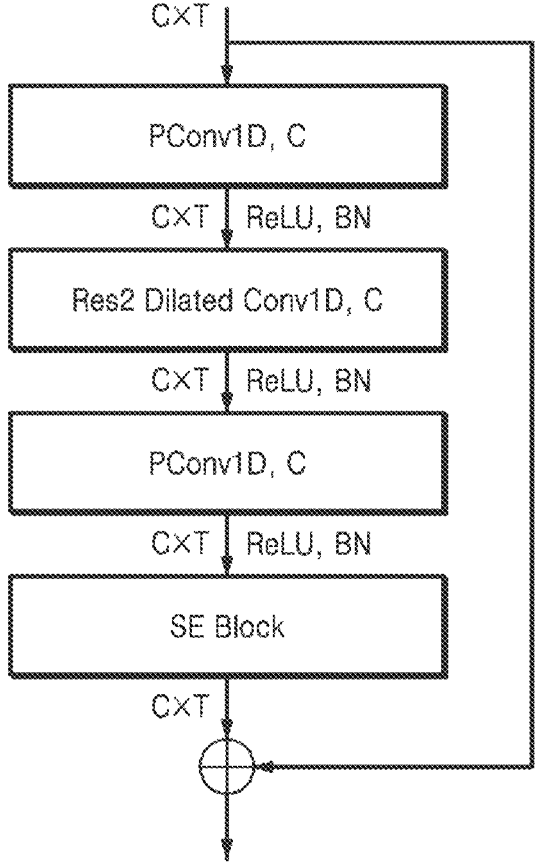
FIG. 3 shows an example of an SE-Res2Net layer.

FIG. 3 shows an example of an SE-Res2Net layer.

The ECAPA-TDNN includes a plurality of SE-Res2Net layers, and one SE-Res2Net layer may correspond to one TS-ConvNeXt block in terms of structure and function. SE-Res2Net layers refer to a combination of the Squeeze-and-Excitation (SE) mechanism and the Res2Net architecture in convolutional neural networks (CNNs). This hybrid approach may integrate the benefits of both SE blocks, which enhance the representational power by modeling channel-wise dependencies, and Res2Net, which improves multi-scale feature extraction capabilities. The dimension of the input and output features of the SE-Res2Net layer is C, and includes T frames. As shown in the example in FIG. 3, the SE-Res2Net layer includes a residual connection.

Hereinafter, the residual connection and skip connection are used interchangeably.

Two PConv1D blocks are located before and after an Res2 Dilated Conv1D block, respectively, and correspond to a convolution with a kernel size of 1. An activation function, ReLU (Rectified Linear Unit), and batch normalization (BN) are applied to the output of each of the PConv1D blocks. The BN normalizes the samples using the mean and variance of the output samples of the batch.

The Res2 Dilated Conv1D block extracts features reflecting multi-scale contexts. If the ECAPA-TDNN includes three SE-Res2Net layers, the dilation factors of each of the SE-Res2Net layers are 2, 3, and 4 in that order. Using the Res2 Dilated Conv1D block with this expansion factor, the SE-Res2Net layer expands the reflection range of the temporal context. The ReLU and BN are also applied to the output of the Res2 Dilated Conv1D block.

The SE block performs a squeeze operation that calculates the average vector of features for each frame, and an excitation operation that calculates a weight for each frame based on the calculated average vector. Herein, the weight for each frame is a value that exists between 0 and 1. The SE block calculates the output of the SE-Res2Net layer by multiplying the features of each frame by the weight of each frame. In conclusion, the SE block may adjust the proportion of features for each frame based on the squeeze operation and excitation operation.

Hereinafter, ConvNeXt, the previous model of the TS-ConvNext block, is described. Compared to the SE-Res2Net, the ConvNeXt uses the design principles of multi-head self-attention (IHSA) and feed-forward network (FFN) in Transformer.

Figure 4:
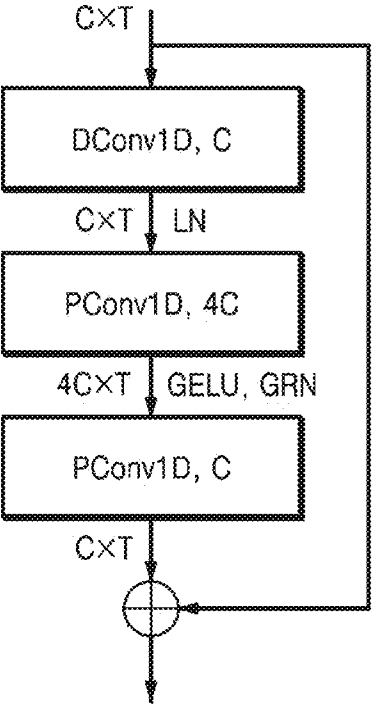
FIG. 4 shows an example of a ConvNeXt block.

FIG. 4 shows an example of a ConvNeXt block.

The dimension of the input and output features of the ConvNeXt block is C, and includes T frames. The input and output of the ConvNeXt block have C×T dimensions. As in the example in FIG. 4, the ConvNeXt block includes a residual connection.

In the ConvNeXt block, a DConv1D block with a large kernel size replaces the Res2 Dilated Conv1D block of the SE-Res2Net layer and is used as the first block. In this connection, the DConv1D block performs a similar operation to the IHSA of the Transformer. In other words, the DConv1D block may generate features that reflect the context between frames. The LN is applied to the output of the DConv1D block.

A PConv1D block that expands the same to 4 times the channels and a PConv1D block that reduces the same to ¼ times the channels are sequentially applied to the output of the DConv1D block to which the LN is applied. In other words, the ConvNeXt block has an inverted bottleneck structure, similar to the Transformer. In addition or alternative, the activation function of gaussian error linear unit (GELU) and global response normalization (GRN) are applied to the input of the last PConv1D block. The GRN adjusts the proportion of features for each frame, similar to the SE block of the SE-Res2Net layer.

As described above, the TS-ConvNeXt layers according to an example of the present disclosure are connected in series and the output of the previous TS-ConvNeXt layer is used as the input of the next TS-ConvNeXt layer. As illustrated in FIG. 2, the output of the Conv1D layer is used as the input of the first TS-ConvNeXt layer. The output features of each of the TS-ConvNeXt layers are concatenated, and the concatenated features are provided as input to the MFA. The TS-ConvNeXt layer includes at least one TS-ConvNeXt block.

Figure 5:
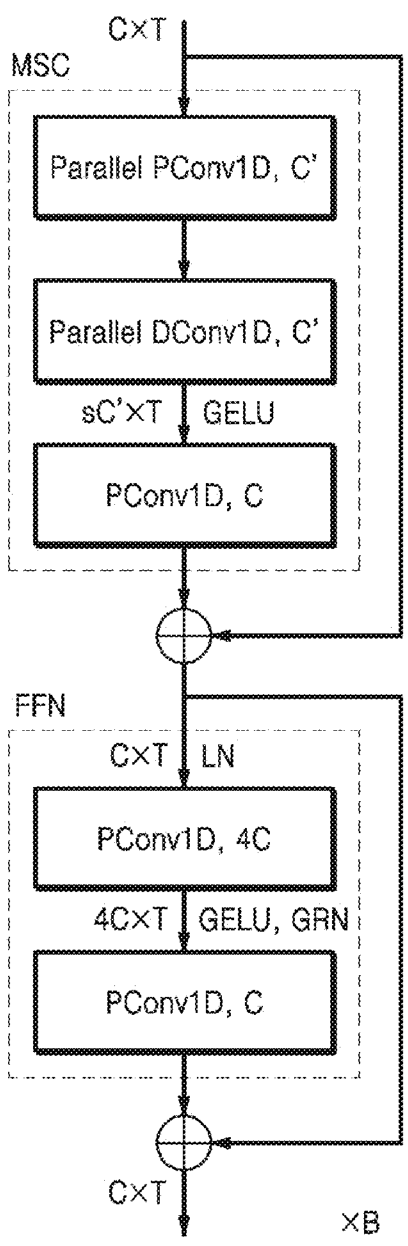
FIG. 5 shows an example of a TS-ConvNeXt block according to an example of the present disclosure.

FIG. 5 shows an example of a TS-ConvNeXt block according to an example of the present disclosure.

To effectively extract the multi-scale features, the TS-ConvNeXt block improves the conventional ConvNeXt block to include two steps of residual connections. The TS-ConvNeXt block includes a multi-scale convolution (MSC) block and FFN. The dimension of the input and output features of the TS-ConvNeXt block is C, and includes T frames. In other words, the input and output of the TS-ConvNeXt block have C×T dimensions. As in the example of FIG. 5, the MSC block and FFN respectively include a residual connection. In the example of FIG. 5, B represents the number of repetitions of the TS-ConvNeXt block included in the TS-ConvNeXt layer. In addition or alternative, as shown in the example of FIG. 5, the TS-ConvNeXt block has an inverse bottleneck structure. The TS-ConvNeXt block may perform inter-frame processing and intra-frame processing more flexibly using the two-step MSC block and FFN.

The MSC block applies temporal multi-scale 1D convolution to frames to generate output features that reflect inter-frame contexts. The MSC block includes a parallel PConv1D block, a parallel DConv1D block, and a PConv1D block. The MSC block replaces the Res2 Dilated Conv1D block in the SE-Res2Net layer.

Figure 6:
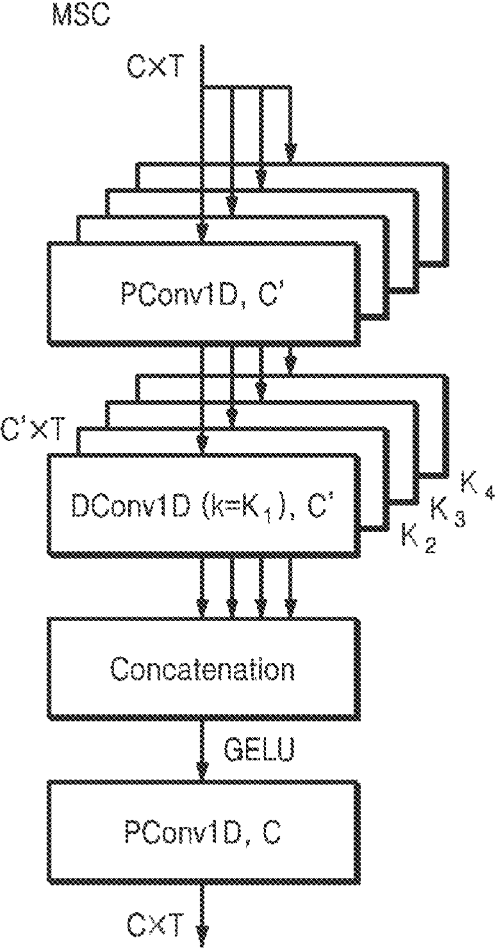
FIG. 6 shows an example of an MSC (multi-scale convolution) block according to an example of the present disclosure.

FIG. 6 shows an example of an MSC block according to an example of the present disclosure.

The MSC block includes a parallel PConv1D block including PConv1D blocks disposed in parallel by a preset scaling factor s, a parallel DConv1D block including DConv1D blocks disposed in parallel by a preset scaling factor s, and a PConv1D block. Each of the PConv1D blocks within a parallel PConv1D block is connected in series to each of the DConv1D blocks within a parallel DConv1D block. In the example of FIG. 6, the preset scaling factor is 4. The scaling factor applies equally to all TS-ConvNeXt blocks. The parallel DConv1D block performs multi-scale 1D convolution using kernels of different sizes ($k=K_1, \ldots, K_4$ in the example of FIG. 6). The parallel DConv1D block uses kernels with large sizes. For example, kernels may have sizes ranging from 7 to 65. Each of the PConv1D blocks generates output features of reduced dimension C' (<C) and provides the same to each of the DConv1D blocks. The output features of each of the DConv1D blocks also have reduced dimensions. The MSC block concatenates the outputs of the parallel DConv1D block and then transfers the concatenated output to the GELU and PConv1D blocks. In the example of FIG. 6, the input features of the PConv1D block have sC' dimension (s=4), and the output features again have a C dimension. The mechanism of the MSC block is simple, but similar to the MASH of the Transformer.

The FFN includes the PConv1D block that expands the same to 4 times the channels and the PConv1D block that reduces the same to ¼ times the channels. The FFN uses the PConv1D blocks to generate output that reflects the context within the frame from the output of the MSC block. In this connection, an activation function GELU and a GRN are applied to the input of a second PConv1D block.

The GRN improves contrast between frames without the need for additional parameter blocks. In other words, the GRN performs a similar function to the SE block of the SE-Res2Net layer. If the feature vector for each frame to which the activation function GELU is applied is expressed as $g_t$ ($1 \le t \le T$), the $g_t$ has a 4C dimension. The GRN applies the L2 norm between frames to $g_t$'s ($1 \le t \le T$) in the 4C×T dimension, and generates a vector $g_a$ reduced to the 4C dimension. Based on the reduced-dimensional vector $g_a$, the response normalization function N(•) normalizes the reduced-dimensional vector $g_a$ as shown in Equation 3.

$$N(g_a) = g_a / \|g_a\|_1 \quad \text{[Equation 3]}$$

In Equation 3, $\|\bullet\|_1$ represents the L1 norm.

The GRN calibrates the feature vector $g_t$ for each frame using a skip connection and a response normalization function, as shown in Equation 4.

$$GRN(g_t) = g_t + \gamma \odot N(g_a) \odot g_t + \beta \quad \text{[Equation 4]}$$

In Equation 4, $\odot$ represents the Hadamad product, which is an operation that takes two matrices of the same dimensions and produces another matrix of the same dimensions, where each element is the product of the corresponding elements from the original matrices. Additionally, $\gamma$ and $\beta$ are trainable parameters and are vectors with 4C dimensions. The initial values of $\gamma$ and $\beta$ are set to 0. Accordingly, the GRN operates like a bypass in the initial stage and adapts the feature vector $g_t$ as training progresses.

Figure 7:
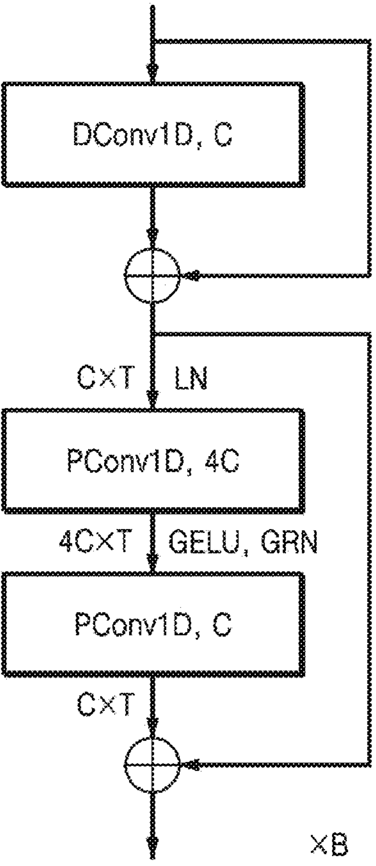
FIG. 7 shows an example of a lightweight TS-ConvNeXt-1 block according to an example of the present disclosure.

As another example, as shown in the example of FIG. 7, the TS-ConvNeXt block may be lightened into a TS-ConvNeXt-1 block. In the example of FIG. 7, B represents the number of repetitions of the light-weighted TS-ConvNeXt-1 block included in the TS-ConvNeXt layer. In the TS-ConvNeXt-1 block, the MSC block is replaced by a Dconv1D block with a large kernel size. The TS-ConvNeXt-1 block uses the DConv1D block to generate features that reflect the context between frames. Compared to the ConvNeXt block, the TS-ConvNeXt-1 block has the difference that the DConv1D block includes a skip connection.

Hereinafter, the operations of the Conv1D layer, PConv1D block, and DConv1D block are described. The Conv1D layer generates a C×T dimensional output from a $C_{mel}$×T dimensional input. The PConv1D block and DConv1D block are assumed to have C×T-dimensional output. As described above, C and $C_{mel}$ represent the number of channels in the frame, and T represents the number of frames. The direction in which the channel index increases within a frame is defined as the channel direction, and the direction in which the frame index increases for the same channel is defined as the time direction. The time direction in 1D convolution corresponds to the space direction in 2D convolution. Since the Conv1D layer, PConv1D block, and DConv1D block all perform the 1D convolution, the kernels are all defined in the time direction.

The Conv1D layer generates features in the time direction by applying the kernel in the time direction and adding the generated results in the channel direction. The Conv1D layer uses C kernels to generate C×T-dimensional output. Since channel-wise calculations are performed, the Conv1D layer may be used to adjust the number of channels between input and output. In the present disclosure, the Conv1D layer adjusts the number of channels between input and output from $C_{mel}$ to C.

The PConv1D block generates features in the channel direction by applying a kernel having a size of 1 and weighting the results generated in the channel direction. The kernel of the PConv1D block has a size of 1 in the time direction and, for example, has weights corresponding to the number of input channels in the channel direction. The PConv1D layer uses C kernels to generate C×T-dimensional output. Since the PConv1D block performs a channel-wise calculation without a time-wise calculation, the features that reflect the context within the frame may be generated. Since the channel-wise calculations are performed, the PConv1D block may be used to adjust the number of channels between input and output. In the present disclosure, the PConv1D block is used to maintain, increase, or decrease the number of channels between input and output.

The DConv1D block generates features in the time direction by applying a large-sized kernel in the time direction. The DConv1D layer uses C kernels to generate C×T-dimensional output. Since the DConv1D block performs a time-wise calculation without a channel-wise calculation, the features that reflect the context between frames may be generated. Since there are no channel-wise calculations, the DConv1D block maintains the number of channels between input and output.

By flexibly adjusting the number of blocks within the speaker verification model 120, the speaker verification apparatus according to an example of the present disclosure may control a trade-off between performance and calculation speed. In the case of the conventional ECAPA-TDNN, the SE-Res2Net layer has a single configuration, so the size of the ECAPA-TDNN is adjusted based on the number of channels C. On the other hand, when having a similar model size, the TS-ConvNeXt layer according to an example of the present disclosure uses a parallel calculation, thus showing faster inference speed compared to the SE-Res2Net layer. Accordingly, the size of NeXt-TDNN may be flexibly set by additionally adjusting the number of repetitions B of the TS-ConvNeXt block in addition or alternative to adjusting the number of channels C. For example, if the model size of the ECAPA-TDNN supports 512 channels (C=512), the NeXt-TDNN with a size similar to the corresponding model may be implemented in a configuration where C=384 and B=1, or C=256 and B=3. In this connection, the NeXt-TDNN according to the former setting has a faster inference speed. The NeXt-TDNN according to the latter setting may show higher performance improvement by extracting high-dimensional feature maps based on a deeper configuration.

Hereinafter, using the example of FIG. 8, a method for the speaker verification apparatus to verify a speaker is described.

Figure 8:
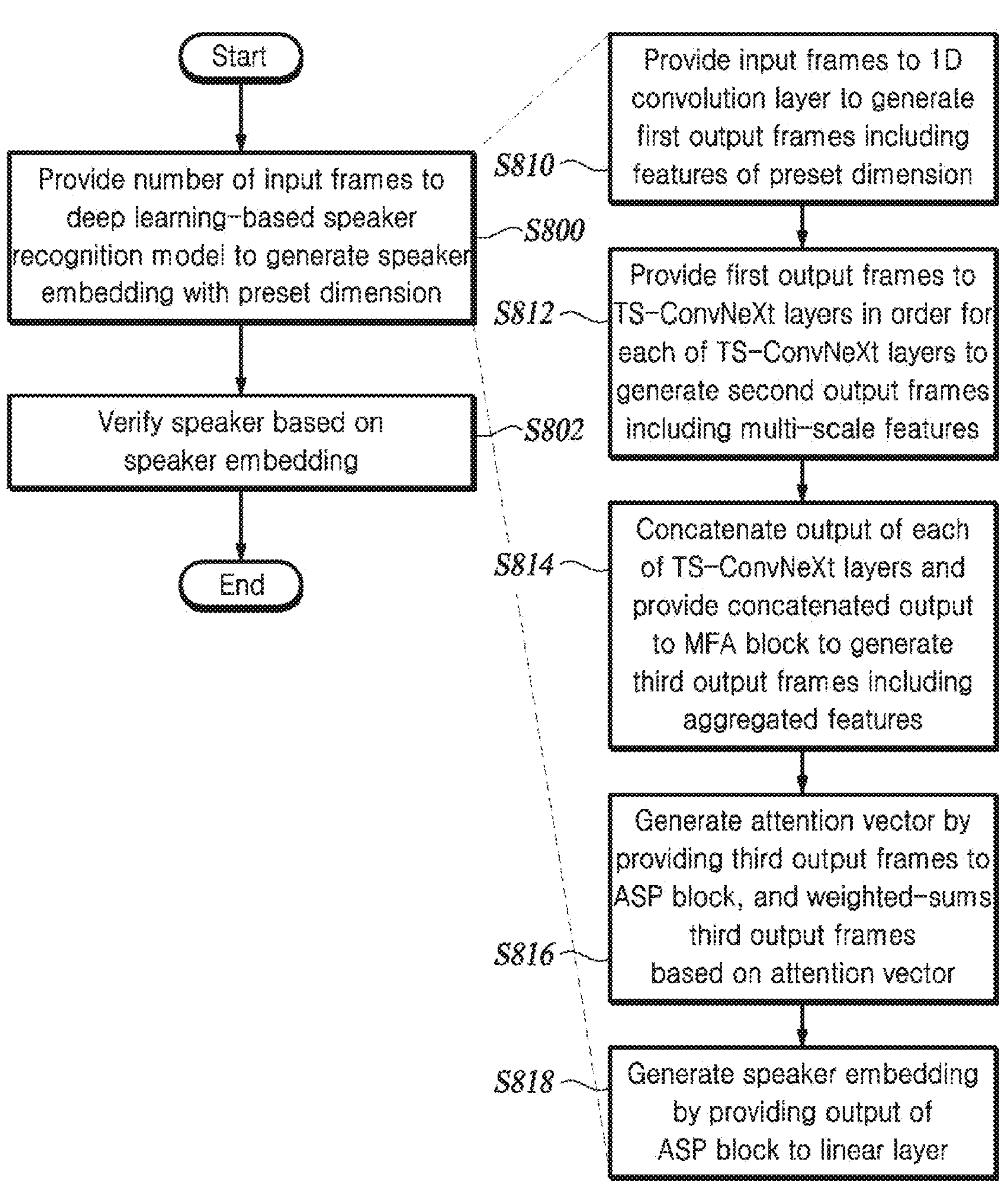
FIG. 8 shows an example of a flowchart showing a method by which the speaker verification apparatus verifies a speaker, according to an example of the present disclosure.

FIG. 8 shows an example of a flowchart showing a method by which the speaker verification apparatus verifies a speaker, according to an example of the present disclosure.

The speaker verification apparatus provides a number of input frames based on speaker utterances to a deep learning-based speaker verification model to generate a speaker embedding with a preset dimension (S800).

The speaker verification apparatus verifies a speaker based on the speaker embedding (S802).

Hereinafter, the generation of the speaker embedding (S800) is described in detail.

The speaker verification apparatus provides input frames to a 1D convolution layer to generate first output frames including features of a preset dimension (S810).

The speaker verification apparatus provides the first output frames to the TS-ConvNeXt layers in order for each of the TS-ConvNeXt layers to generate second output frames including multi-scale features (S812). Herein, the TS-ConvNeXt layers are connected in series, and each of the TS-ConvNeXt layers includes at least one TS-ConvNeXt block. The at least one TS-ConvNeXt block is connected in series.

The input and output of each of the TS-ConvNeXt layers include the same number of frames including features of the same dimension. In addition or alternative, the input and output of each of the TS-ConvNeXt blocks include the same number of frames including features of the same dimension.

Hereinafter, the generation of the second output frames performed in each of the TS-ConvNeXt blocks among the at least one TS-ConvNeXt block (S812), in other words, the operation of each of the TS-ConvNeXt blocks is described in detail.

The speaker verification apparatus provides the input frames of each of the TS-ConvNeXt blocks to the MSC block and performs temporal multi-scale 1D convolution, thereby generating intermediate frames that reflect inter-frame contexts. To generate the intermediate frames, the speaker verification apparatus performs the following stages.

The speaker verification apparatus generates reduced-dimensional features by providing input frames from each of the TS-ConvNeXt blocks to the parallel PConv1D block and performing 1D pointwise convolution. The speaker verification apparatus provides the output of the parallel PConv1D block to the parallel DConv1D block to perform 1D depth-wise convolution based on kernels of different sizes. The speaker verification apparatus processes a concatenation of outputs of parallel DConv1D blocks using the activation function GELU. The speaker verification apparatus generates the intermediate frames by providing the output of the GELU to the first PConv1D block to perform the 1D pointwise convolution. Herein, the parallel PConv1D block includes the PConv1D blocks disposed in parallel by a preset scaling factor, and the parallel DConv1D block includes the DConv1D blocks disposed in parallel by a preset scaling factor.

The speaker verification apparatus provides the intermediate frames to the FFN to generate output frames of each of the TS-ConvNeXt blocks that reflect the context within the frame. To generate the output frames of each of the TS-ConvNeXt blocks, the speaker verification apparatus performs the following stages.

The speaker verification apparatus provides the intermediate frames to the second PConv1D block and applies the 1D pointwise convolution to increase the number of features of each of the intermediate frame. The speaker verification apparatus provides the output of the second PConv1D block to the GRN to globally normalize the output of the second PConv1D block to improve the contrast between the intermediate frames.

To improve the contrast between the intermediate frames, the speaker verification apparatus generates a reduced-dimensional vector by applying a response normalization function to the feature vectors for each frame corresponding to the output of the second PConv1D block. The speaker verification apparatus calibrates each of the feature vectors for each frame using skip connection and reduced-dimensional vectors.

The speaker verification apparatus provides the output of the GRN to a third PConv1D block to reduce the number of features of the output of the GRN.

The speaker verification apparatus concatenates the output of each of the TS-ConvNeXt layers and provides the concatenated output to the MFA block to generate third output frames including aggregated features (S814).

The speaker verification apparatus generates an attention vector by providing the third output frames to the ASP block, and weighted-sums the third output frames based on the attention vector (S816). The speaker verification apparatus generates an average vector and a standard deviation vector by weighted-summing the third output frames based on the attention vector.

The speaker verification apparatus generates speaker embedding by providing the output of the ASP block to the linear layer (S818).

Hereinafter, an experimental example showing the performance of an NeXt-TDNN model, the speaker verification model according to an example of the present disclosure, is described.

The performance of the speaker verification model may be measured based on elements such as a speaker verification rate according to the generation of differential embeddings, model size, model calculation amount, model calculation speed, and the like. An example of the present disclosure presents simulation results measuring the performance of the aforementioned elements.

In the simulation, the size of the NeXt-TDNN model is calibrated by adjusting the number of channels and the number of repetitions of the TS-ConvNeXt-1 block as described above. For comparison with the NeXt-TDNN model according to an example of the present disclosure, the ECAPA-TDNN model using SE-Res2Net is used as a baseline. In the simulation, the ECAPA-TDNN model supports 512 channels. In the simulation, an utterance database for speaker verification (for example, VoxCeleb1 and/or VoxCeleb2) is used for training and test.

By applying 512 FFT (Fast Fourier Transform) to an utterance frame on the time domain of 25 ms, a frame on the frequency domain corresponding to $C_{mel}$=80 is generated. On the time domain, utterance frames have an overlapping section of 10 ms. The NeXt-TDNN model is trained using randomly sampled 3-second segments. As described above, the AAM-softmax function is used for speaker identification. In the MFA block, $C_{MFA}$ is set to 3C (C is the number of channels). The number C' of the abbreviated channels in the MSC block is set to C/s (where s is a scaling factor).

Table 1 and Table 2 show the type of NeXt-TDNN model used in the simulation and the measured performance elements.

TABLE 1

| Model | Block used | Block repetition | Model Size (M) | Calculation amount (GMAC) |
|---|---|---|---|---|
| ECAPA-TDNN model | SE-Res2Net | | 6.19 | 1.053 |
| NeXt-TDNN model 1 | TS-ConvNe Xt-l | | 5.86 | 1.077 |
| NeXt-TDNN model 2 | TS-ConvNe Xt-l | 3 | 5.94 | 1.119 |
| NeXt-TDNN model 3 | TS-ConvNe Xt-l | 3 | 1.65 | 0.297 |

TABLE 2

| Model | EER (%) | RTF ($10^{-3}$) (CPU env.) | RTF ($10^{-3}$) (GPU env.) |
|---|---|---|---|
| ECAPA-TDNN model | 1.24 | 5.81 | 2.02 |
| NeXt-TDNN model 1 | 1.22 | 3.81 | 0.64 |

TABLE 2-continued

| Model | EER (%) | RTF ($10^{-3}$) (CPU env.) | RTF ($10^{-3}$) (GPU env.) |
|---|---|---|---|
| NeXt-TDNN model 2 | 1.07 | 5.10 | 1.36 |
| NeXt-TDNN model 3 | 1.22 | 3.08 | 1.33 |

In Tables 1 and 2, the calculation amount of the model is expressed in GMAC (Giga Multiply and Accumulation). The size of the model is expressed by the number of parameters included in the model. A real time factor (RTF), which represents the calculation speed of the model, is the duration of the input divided by the processing time of the model. In this connection, the unit of duration and processing time is seconds. An equal error rate (EER), which represents the speaker verification rate, is the rate at which the FAR (False Alarm Rate) and FRR (False Rejection Rate) of the verification result become the same. The smaller the EER, the better the speaker verification rate.

In Tables 1 and 2, NeXt-TDNN model 1 is a model for a fast calculation speed, and the number of repetitions of the TS-ConvNeXt-1 block is set to 1. By setting the number of channels to 384, the NeXt-TDNN model 1 maintains a similar size and calculation amount as the ECAPA-TDNN model for comparison. Compared to the ECAPA-TDNN model, the NeXt-TDNN model 1 improves RTF by 68.3% in a graphical processing unit (GPU) environment and reduces the model size by 0.33 M. In addition or alternative, the NeXt-TDNN Model 1 improves the speaker verification rate by 0.02% p.

NeXt-TDNN Model 2 is a model to improve speaker verification performance, and the number of repetitions of the TS-ConvNeXt-1 block is set to 3. By setting the number of channels to 256, the NeXt-TDNN model 2 maintains a similar size and calculation amount as the ECAPA-TDNN model for comparison. The NeXt-TDNN Model 2 improves the speaker verification rate by 13.7% compared to the ECAPA-TDNN model. In addition or alternative, the NeXt-TDNN Model 2 improves RTF by 32.7% in the GPU environment and reduces the model size by 0.25 M.

NeXt-TDNN Model 3 is a model for lightweighting, and the number of repetitions of the TS-ConvNeXt-1 block is set to 3. By setting the number of channels to 128, the NeXt-TDNN Model 3 maintains a reduced size and calculation amount compared to other models used in simulations. The NeXt-TDNN Model 3 may be applied to mobile products that prioritize lightweighting. Compared to the ECAPA-TDNN model, the NeXt-TDNN model 3 reduces the model size by 73.3% while maintaining similar verification performance. In addition or alternative, the NeXt-TDNN Model 3 reduces the calculation amount by 71.8% and improves RTF by 47% in a CPU (Central Processing Unit) environment and 34.2% in the GPU environment.

As shown in the simulation results shown in Tables 1 and 2, the NeXt-TDNN model according to an example of the present disclosure achieves similar verification performance compared to the ECAPA-TDNN model by adjusting the number of channels and the number of repetitions of the TS-ConvNeXt-1 block. In addition or alternative, the performance of elements such as model size, model calculation amount, and model calculation speed may be greatly improved.

The TS-ConvNeXt-1 block is used in the simulations shown in Tables 1 and 2, but the TS-ConvNeXt block may be used instead of the TS-ConvNeXt-1 block. In other words, the NeXt-TDNN model according to an example of the present disclosure adjusts the number of channels and the number of repetitions of the TS-ConvNeXt block, thereby having a similar model size and model calculation amount compared to the ECAPA-TDNN model, while greatly improving the performance of elements such as speaker verification rate and model calculation speed.

Figure 9:
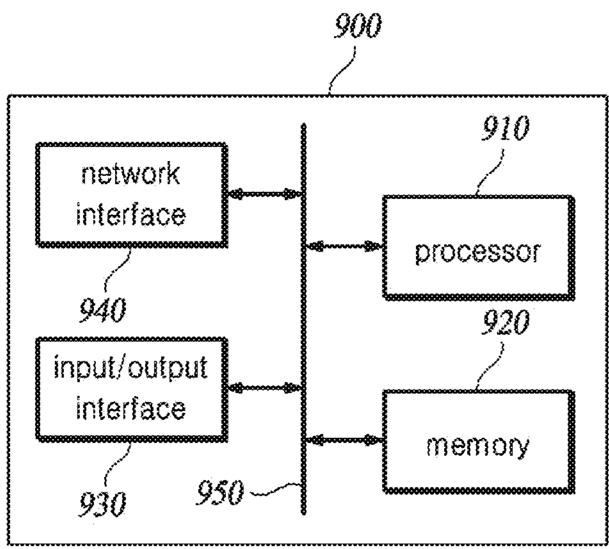
FIG. 9 shows an example of a computing device according to an example of the present disclosure.

FIG. 9 shows an example of a computing device according to an example of the present disclosure.

The method for speaker verification according to examples of the present disclosure may be implemented by the computing device 900 shown in FIG. 9.

As shown in FIG. 9, the computing device 900 may include at least one processor 910, a memory 920, a network interface 930, and an input/output interface 940. A bus 950 provides a mechanism for allowing components of the computing device 900 to communicate with each other as intended. Although the bus 950 is schematically shown as a single bus, alternative implementations may use a plurality of buses.

The processor 910 may be configured to process instructions of a computer program by performing basic arithmetic, logic, and input/output operations. Instructions may be provided to the processor 910 through the memory 920 or the network interface 930. For example, the processor 910 may be configured to execute received instructions according to program codes stored in a recording device such as the memory 920.

The memory 920 is a computer-readable recording medium, and may include a random access memory (RAM) and permanent mass storage devices such as a read only memory (ROM) or a disk drive. Here, permanent mass recording devices such as a disk drive may be included in the computing device 900 as separate permanent storage devices separate from the memory 920.

Additionally, an operating system and at least one program code may be stored in the memory 920. Such software components may be loaded into the memory 920 from a computer-readable recording medium separate from the memory 920. Such separate computer-readable recording media may include computer-readable recording media such as floppy drives, disks, tapes, DVD/CD-ROM drives, and memory cards. In another example, software components may be loaded into the memory 920 through the network interface 930 rather than a computer-readable recording medium. For example, software components may be loaded into the memory 920 of the computing device 900 based on a computer program installed by files received through the network interface 930.

The network interface 930 may provide a function for the computing device 900 to communicate with other external devices (e.g., a terminal including a voice recognition module installed in a vehicle for controlling autonomous driving of the vehicle, etc.) through a wired or wireless communication network. For example, requests, instructions, data, files, and the like generated by the processor 910 of the computing device 900 according to the program code stored in a recording device such as the memory 920 may be transmitted to other external devices through a wired or wireless communication network under the control of the network interface 930. Conversely, signals, instructions, data, files, and the like may be transmitted from other external devices to the computing device 900 through the network interface 930 of the computing device 900 via a wired or wireless communication network. Signals, instructions, data, and the like received through the network interface 930 may be transmitted to the processor 910 or the memory 920, and files and the like may be stored in a storage medium (the aforementioned permanent storage device) that may be additionally included in the computing device 900.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver if the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.)

The input/output interface 940 may be a means for interfacing with input/output devices. For example, input devices may include devices such as a microphone, a keyboard, and mouse, and output devices may include devices such as a display and a speaker. As another example, the input/output interface 940 may be a means for interfacing with a device in which input and output functions are integrated, such as a touchscreen. The input/output devices may be integrated with the computing device 900.

Additionally, in other examples, the computing device 900 may include fewer or more components than those shown in FIG. 9. For example, the computing device 900 may be implemented to include at least some of the above-described input/output devices or may further include other components such as a transceiver, a database, etc.

The present disclosure seeks to provide a speaker verification method and an apparatus for generating a speaker embedding using NeXt-time delay neural network (TDNN), a deep learning-based speaker verification model including TS-ConvNeXt (Two-step ConvNeXt) layers.

In addition or alternative, the present disclosure seeks to provide a speaker verification method and apparatus using a TS-ConvNeXt layer that repeatedly includes a multi-scale convolution (MSC) block and a feed-forward network (FFN) as a backbone block of the speaker verification model. Here, the MSC block applies temporal multi-scale convolution to frames based on a large-sized kernel and the FFN processes information for each frame.

At least one example of the present disclosure provides a speaker verification apparatus. The apparatus includes at least one processor and a memory that stores instructions and communicates with the at least one processor. Here, by executing the instructions the at least one processor is configured to perform generating a speaker embedding with a preset dimension by providing a plurality of input frames based on an utterance of a speaker to a deep learning-based speaker verification model. The at least one processor is also configured to perform verifying the speaker based on the speaker embedding. Here, generating the speaker embedding includes providing the input frames to a 1-dimensional (1D) convolution layer to generate first output frames including features of a predefined dimension. Generating the speaker embedding also includes providing the first output frames to two-step (TS)-ConvNeXt layers in order for each of the two-step (TS)-ConvNeXt layers to generate second output frames comprising multi-scale features. Here, the TS-ConvNeXt layers are connected in series, each of the TS-ConvNeXt layers includes at least one TS-ConvNeXt block, and the at least one TS-ConvNeXt block is connected in series. Generating the speaker embedding also includes generating third output frames including aggregated features by concatenating an output of each of the TS-ConvNeXt layers and by providing the concatenated output to an MFA (multi-layer feature aggregation) block. Generating the speaker embedding also includes generating an attention vector by providing the third output frames to an attentive statistics pooling (ASP) block, weighted-summing the third output frames based on the attention vector, and providing an output of the ASP block to a linear layer to generate the speaker embedding.

Another example of the present disclosure provides a method of speaker verification, performed by a speaker verification apparatus. The method includes generating a speaker embedding with a preset dimension by providing a plurality of input frames based on an utterance of a speaker to a deep learning-based speaker verification model. The method also includes verifying the speaker based on the speaker embedding. Here, generating the speaker embedding includes providing the input frames to a 1-dimensional (1D) convolution layer to generate first output frames including features of a predefined dimension. Generating the speaker embedding also includes providing the first output frames to two-step (TS)-ConvNeXt layers in order for each of the two-step (TS)-ConvNeXt layers to generate second output frames comprising multi-scale features. Here, the TS-ConvNeXt layers are connected in series, each of the TS-ConvNeXt layers includes at least one TS-ConvNeXt block, and the at least one TS-ConvNeXt block is connected in series. Generating the speaker embedding also includes generating third output frames including aggregated features by concatenating an output of each of the TS-ConvNeXt layers and by providing the concatenated output to an MFA (multi-layer feature aggregation) block. Generating the speaker embedding also includes generating an attention vector by providing the third output frames to an attentive statistics pooling (ASP) block, weighted-summing the third output frames based on the attention vector, and providing an output of the ASP block to a linear layer to generate the speaker embedding.

Yet another example of the present disclosure provides a computer-readable recording medium storing instructions. When executed by the computer, the instructions cause the computer to perform generating a speaker embedding with a preset dimension by providing a plurality of input frames based on an utterance of a speaker to a deep learning-based speaker verification model. The instructions also cause the computer to perform verifying the speaker based on the speaker embedding. Here, generating the speaker embedding includes generating first output frames comprising features of a predefined dimension by providing the input frames to a 1-dimensional (1D) convolution layer. Generating the speaker embedding also includes providing the first output frames to two-step (TS)-ConvNeXt layers in order for each of the two-step (TS)-ConvNeXt layers to generate second output frames comprising multi-scale features. Here, the TS-ConvNeXt layers are connected in series, each of the TS-ConvNeXt layers includes at least one TS-ConvNeXt block, and the at least one TS-ConvNeXt block is connected in series. Generating the speaker embedding also includes generating third output frames including aggregated features by concatenating an output of each of the TS-ConvNeXt layers and by providing the concatenated output to an MFA (multi-layer feature aggregation) block. Generating the speaker embedding also includes generating an attention vector by providing the third output frames to an attentive statistics pooling (ASP) block, weighted-summing the third output frames based on the attention vector, and providing an output of the ASP block to a linear layer to generate the speaker embedding.

As described above, the present disclosure provides a speaker verification method and apparatus for a generating a speaker embedding using NeXt-TDNN, a deep learning-based speaker verification model including TS-ConvNeXt layers. Thus, the speaker verification method and apparatus improve the performance of speaker verification while reducing the size and calculation amount of the speaker verification model.

In addition or alternative, as described above, the present disclosure provides a speaker verification method and apparatus using a TS-ConvNeXt layer that repeatedly includes a multi-scale convolution (MSC) block and a feed-forward network (FFN) as a backbone block of the speaker verification model. Here, the MSC block applies temporal multi-scale convolution to frames based on a large-sized kernel and the FFN processes information for each frame. Thus, the speaker verification method and apparatus extract a high-dimensional feature map without significantly increasing the parameters and calculation amount of the speaker verification model.

Although the steps in the respective flowcharts are described to be sequentially performed, the steps merely instantiate the technical idea of some examples of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative examples that may be implemented in various other manners. The functions described in some examples may be realized by hardware, software, firmware, and/or their combination. It should also be understood that the functional components described in the present disclosure are labeled by " . . . unit" to strongly emphasize the possibility of their independent realization.

Meanwhile, various methods or functions described in some examples may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although examples of the present disclosure have been described for illustrative purposes, those having ordinary skill in the art to which this disclosure pertains should appreciate that various modifications, additions, and substitutions are possible, without departing from the idea and scope of the present disclosure. Therefore, examples of the present disclosure have been described for the sake of brevity and clarity. The scope of the technical idea of the examples of the present disclosure is not limited by the illustrations. Accordingly, those having ordinary skill in the art to which the present disclosure pertains should understand that the scope of the present disclosure should not be limited by the above explicitly described examples but by the claims and equivalents thereof.

What is claimed is:

1. An apparatus comprising:

at least one processor; and a memory that stores instructions and communicates with the at least one processor, wherein the at least one processor is configured to execute the instructions to perform:

generating, based on an utterance of a speaker to a deep learning-based speaker verification model, a speaker embedding with a preset dimension by:

generating first output frames by providing a plurality of input frames to one dimensional convolution layer, wherein the first output frames comprise features of a predefined dimension;

providing the first output frames to two-step layers, wherein each of the two-step layers is configured to generate second output frames comprising multi-scale features, wherein the two-step layers are connected in series, wherein each of the two-step layers comprises at least one two-step block, and wherein the at least one two-step block is connected in series;

generating third output frames comprising aggregated features by concatenating an output of each of the two-step layers and by providing the concatenated output to a multi-layer feature aggregation block;

generating an attention vector by providing the third output frames to an attentive statistics pooling (ASP) block;

weighted-summing, based on the attention vector, the third output frames; and generating the speaker embedding by providing an output of the ASP block to a linear layer, wherein the output of the ASP block is generated based on the weighted-summing;

verifying, based on the speaker embedding, the speaker; and detecting, based on the verified speaker, an identity of a user associated with the apparatus.

2. The apparatus of claim 1, wherein each of the two-step layers reflects intra-frame and inter-frame contexts to generate the multi-scale features.

3. The apparatus of claim 1, wherein an input and an output of each of the two-step layers comprise an equal number of frames, wherein the frames comprise features of an equal dimension.

4. The apparatus of claim 1, wherein an input and an output of each of the at least one two-step block comprises an equal number of frames, wherein the frames comprise features of an equal dimension.

5. The apparatus of claim 1, wherein each of the at least one two-step block comprises:

a multi-scale convolution (MSC) block that generates intermediate frames in which inter-frame contexts are reflected by applying temporal multi-scale one dimensional convolution to input frames of each of the at least one two-step block; and a feed-forward network (FFN) that generates output frames of each of the at least one two-step block in which intra-frame contexts are reflected from the intermediate frames.

6. The apparatus of claim 5, wherein each of the MSC block and the FFN comprises a residual connection.

7. The apparatus of claim 5, wherein the MSC block comprises:

a pointwise parallel block that comprises pointwise convolution blocks disposed in parallel by a preset scaling factor and generates reduced-dimensional features by applying one dimensional pointwise convolution to the input frames of each of the at least one two-step block; and a depth-wise parallel block that comprises depth-wise convolution blocks disposed in parallel by the preset scaling factor and applies, based on kernels of different sizes, one dimensional depth-wise convolution to an output of the pointwise parallel block.

8. The apparatus of claim 7, wherein the MSC block further comprises:

a gaussian error linear unit (GELU), which is an activation function that processes concatenation of outputs of the depth-wise parallel block; and a first pointwise convolution block of the pointwise convolution blocks, wherein the first pointwise convolution block generates the intermediate frames by applying the one dimensional pointwise convolution to an output of the GELU.

9. The apparatus of claim 5, wherein the FFN comprises:

a second pointwise convolution block of pointwise convolution blocks, wherein the second pointwise convolution block applies one dimensional pointwise convolution to the intermediate frames to expand a number of features of each of the intermediate frames;

global response normalization (GRN), which improves contrast between the intermediate frames by globally normalizing an output of the second pointwise convolution block; and a third pointwise convolution block of the pointwise convolution blocks, wherein the third pointwise convolution block reduces a number of features of an output of the GRN.

10. The apparatus of claim 9, wherein the GRN:

generates an reduced-dimensional vector by applying a response normalization function to feature vectors for each frame corresponding to the output of the second pointwise convolution block; and calibrates, based on skip connection and the reduced-dimensional vector, each of the feature vectors for each frame.

11. The apparatus of claim 1, wherein the ASP block generates an average vector and a standard deviation vector by weighted-summing, based on the attention vector, the third output frames.

12. A method performed by a processor, the method comprising:

generating, based on an utterance of a speaker to a deep learning-based speaker verification model, a speaker embedding with a preset dimension by:

generating first output frames by providing a plurality of input frames to one dimensional convolution layer, wherein the first output frames comprises features of a predefined dimension;

providing the first output frames to two-step layers, wherein each of the two-step layers generates second output frames comprising multi-scale features, wherein the two-step layers are connected in series, wherein each of the two-step layers comprises at least one two-step block, and wherein the at least one two-step block is connected in series;

generating third output frames comprising aggregated features by concatenating an output of each of the two-step layers and by providing the concatenated output to a multi-layer feature aggregation block;

generating an attention vector by providing the third output frames to an attentive statistics pooling (ASP) block;

weighted-summing, based on the attention vector, the third output frames; and generating the speaker embedding by providing an output of the ASP block to a linear layer, wherein the output of the ASP block is generated based on the weighted-summing;

verifying, based on the speaker embedding, the speaker; and detecting, based on the verified speaker, an identity of a user associated with the apparatus.

13. The method of claim 12, wherein generation of the second output frames comprises:

generating intermediate frames in which inter-frame contexts are reflected by providing input frames of each of the at least one two-step block to a multi-scale convolution block to perform temporal multi-scale one dimensional convolution; and generating output frames of each of the at least one two-step block in which intra-frame contexts are reflected by providing the intermediate frames to a feed-forward network.

14. The method of claim 13, wherein generating the intermediate frames comprises:

generating reduced-dimensional features by providing the input frames of each of the at least one two-step block to a pointwise parallel block to perform one dimensional pointwise convolution; and providing an output of the pointwise parallel block to a depth-wise parallel block to perform, based on kernels of different sizes, one dimensional depth-wise convolution.

15. The method of claim 14, wherein generating the intermediate frames further comprises:

processing, based on a gaussian error linear unit (GELU), concatenation of outputs of the depth-wise parallel block, wherein the GELU is an activation function; and generating the intermediate frames by providing an output of the GELU to a first pointwise convolution block to perform one dimensional pointwise convolution.

16. The method of claim 13, wherein generating the output frames of each of the at least one two-step block comprises:

expanding a number of features of each of the intermediate frames by providing the intermediate frames to a second pointwise convolution block and applying one dimensional pointwise convolution;

improving contrast between the intermediate frames by providing an output of the second pointwise convolution block to global response normalization (GRN) to globally normalize the output of the second pointwise convolution block; and providing an output of the GRN to a third pointwise convolution block to reduce a number of features of the output of the GRN.

17. The method of claim 16, wherein the improving the contrast between the intermediate frames comprises:

generating an reduced-dimensional vector by applying a response normalization function to feature vectors for each frame corresponding to the output of the second pointwise convolution block; and calibrating, based on skip connection and the reduced-dimensional vector, each of the feature vectors for each frame.

18. A non-transitory computer-readable recording medium storing instructions, when executed, cause:

generating, based on an utterance of a speaker to a deep learning-based speaker verification model, a speaker embedding with a preset dimension by:

generating first output frames by providing a plurality of input frames to one dimensional convolution layer, wherein the first output frames comprise features of a predefined dimension;

providing the first output frames to two-step layers, wherein each of the two-step layers configured to generate second output frames comprising multi-scale features, wherein the two-step layers are connected in series, wherein each of the two-step layers comprises at least one two-step block, and wherein the at least one two-step block is connected in series;

generating third output frames comprising aggregated features by concatenating an output of each of the two-step layers and by providing the concatenated output to a multi-layer feature aggregation block;

generating an attention vector by providing the third output frames to an attentive statistics pooling (ASP) block;

weighted-summing, based on the attention vector, the third output frames; and generating the speaker embedding by providing an output of the ASP block to a linear layer, wherein the output of the ASP block is generated based on the weighted-summing;

verifying, based on the speaker embedding, the speaker; and detecting, based on the verified speaker, an identity of a user associated with the apparatus.

19. The non-transitory computer-readable recording medium of claim 18, wherein each of the two-step layers reflects intra-frame and inter-frame contexts to generate the multi-scale features.

20. The non-transitory computer-readable recording medium of claim 18, wherein an input and an output of each of the two-step layers comprise an equal number of frames, wherein the frames comprise features of an equal dimension.

* * * * *